United States Patent
Stritt et al.

(10) Patent No.: US 12,545,794 B2
(45) Date of Patent: Feb. 10, 2026

(54) SECURITY FEATURE, PRINTING INK, DOCUMENT OF VALUE, AND MANUFACTURING METHOD

(71) Applicant: GIESECKE+DEVRIENT CURRENCY TECHNOLOGY GMBH, Munich (DE)

(72) Inventors: Anika Stritt, Munich (DE); Verena Engelhardt, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 18/708,643

(22) PCT Filed: Nov. 23, 2022

(86) PCT No.: PCT/DE2022/100877
§ 371 (c)(1),
(2) Date: May 9, 2024

(87) PCT Pub. No.: WO2023/093943
PCT Pub. Date: Jun. 1, 2023

(65) Prior Publication Data
US 2025/0018739 A1    Jan. 16, 2025

(30) Foreign Application Priority Data

Nov. 25, 2021 (DE) ..................... 10 2021 005 853.4
Dec. 9, 2021 (DE) ..................... 10 2021 006 081.4

(51) Int. Cl.
*C09D 11/037* (2014.01)
*C09D 11/50* (2014.01)
*C09K 11/06* (2006.01)

(52) U.S. Cl.
CPC ............ *C09D 11/037* (2013.01); *C09D 11/50* (2013.01); *C09K 11/06* (2013.01)

(58) Field of Classification Search
CPC ...... G07D 7/205; G07D 7/1205; B42D 25/29; B42D 25/387; B41M 3/144
See application file for complete search history.

(56) References Cited

U.S. PATENT DOCUMENTS

| | | |
|---|---|---|
| 7,399,434 B2 | 7/2008 | Potrawa et al. |
| 10,988,629 B2 | 4/2021 | Kecht et al. |
| 2011/0232752 A1 | 9/2011 | Mataki et al. |

FOREIGN PATENT DOCUMENTS

| | | |
|---|---|---|
| DE | 10163295 B4 | 3/2004 |
| WO | 9849163 A1 | 11/1998 |
| WO | 2017080656 A1 | 5/2017 |

OTHER PUBLICATIONS

German Search Report from corresponding DE Application No. 102021006081.4, Jul. 15, 2022.
(Continued)

*Primary Examiner* — Khanh T Nguyen
(74) *Attorney, Agent, or Firm* — Workman Nydegger

(57) ABSTRACT

A security feature for safeguarding a document of value, includes an organometallic luminescent substance which, on excitation with radiation in the UV-A range, has emission of radiation in the visible wavelength range, especially with green and/or red light, wherein the luminescent substance is based on a polynuclear, heteroleptic lanthanoid complex of the formula (I) [Mx(NN ligand)a(OO ligand)b] (I) where x, a and b are natural numbers, where x≥2, a≥2 and b≥6; M is a lanthanoid selected from the group consisting of Eu and Th; the OO ligand is a ligand that coordinates via oxygen atoms and the NN ligand is a nitrogen ligand having a phenanthroline base skeleton.

24 Claims, 5 Drawing Sheets

(56) References Cited

OTHER PUBLICATIONS

International Search Report from corresponding PCT Application No. PCT/DE2022/100877, Apr. 26, 2023.

Sun Hui-Juan et al., "Synthesis, characterization and luminescence property of ternary rare earth complexes with azatriphenylenes as highly efficient sensitizers", Journal of Photochemistry, vol. 219, No. 2-3, Apr. 1, 2011, pp. 243-249.

Jin Cheng-Wei et al., "Preparation, crystal structures and properties of a series of novel lanthanide complexes based on 2,3-dimethoxybenzoic acid and 1,10-phenanthroline", Polyhedron, vol. 135, Jul. 14, 2017, pp. 206-215.

Xia Li et al., "Synthesis, Structure and Luminescence Properties of Four Novel Terbium 2-Fluorobenzoate Complexes", European Journal of Inorganic Chemistry, Jul. 1, 2005, 2909-2918.

Xiao-ming Ren et al.: "Preparation and fluorescence properties of ternary complexes of Eu(BA)3PIP and Eu(BA) 3phen," Chinese Journal of Luminescence, vol. 30, No. 2, Apr. 1, 2009, , pp. 252-256.

SECURITY FEATURE, PRINTING INK, DOCUMENT OF VALUE, AND MANUFACTURING METHOD

BACKGROUND

The invention relates to a security feature for safeguarding of a document of value, to a printing ink comprising the security feature, to a document of value and to processes for producing the security feature and the document of value. Luminescent substances that are used for evidence of authenticity via radiation with a suitable light source have been used for many years for safeguarding of documents of value. The luminescent substances that are normally invisible under daylight are excited by radiation of suitable wavelength (e.g. UV, NIR), and the presence thereof is verified by the luminescent light. The luminescence can firstly be assessed visually, for example by the presence of a luminescence emission with a defined color and a defined spatial pattern. Secondly, machine examination is also known, in which luminescence emission is recorded with an optoelectronic detector and the measurement signal is verified for defined characteristic properties, in order to obtain a pointer as to the authenticity of the document of value. Most inorganic luminophores show uncharacteristic, broad emission spectra, are commercially available and have much lower luminescence yields compared to the organic luminescent substances typically used for visual verification. By virtue of the high loading of a printing ink needed as a result, it is not possible to print intricate patterns, but only broad areas. Inorganic luminophores are therefore only of limited suitability for the safeguarding of documents of value via luminescent prints. Lanthanoid complexes are therefore of particular interest because of their narrowband emission spectrum, their emission in the visible part of the spectrum, their long luminescence lifetime (in some cases up to a few milliseconds) and, as a result, the possibility of machine reading on a banknote processing machine. Decay times in the region of at least 10 µs, preferably at least 100 µs, especially preferably between 250 µs and 5 ms, enable simple machine evaluation of the phosphorescence emission spectrum.

The selection of organometallic phosphorescent substances suitable for safeguarding of documents of value for automated recognition of authenticity is restricted essentially to red-phosphorescing europium complexes. Europium complexes that are excitable in the UV-A range are primarily europium diketonate complexes, but these have the disadvantage of low light stability and low thermal stability. By contrast, europium-carboxylic acid complexes in most cases are notable for the desired light stability and thermal stability. These have the disadvantage that, in finely divided or ground form, as required, for example, for production of offset printing inks, they show intense luminescence only with short-wave UV light in the UV-C range. Light-stable and intensely luminescing europium complexes for use as security feature are limited to a few examples, as described, for example, in DE 10163295 B4. Uncomplicated influencing of the excitation spectra is not possible here without altering lightfastness.

Green-phosphorescing lanthanoid complexes that are excitable in the UV-A range in particular (metal center M=Tb), according to the current state of knowledge, are barely available on the market in the field of safeguarding of documents of value. Mononuclear Tb complexes in particular, because of the energy level involved in ligand-metal energy transfer, have a tendency to transfer energy back from the metal (metal center) to the ligand and hence have low luminescence quantum yields (back-energy transfer, BET). The $^5D_4$ energy level of the terbium ion at 20 500 cm$^{-1}$ greatly restricts the selection of possible ligands since the $^1T$ level thereof has to be at least 1850 cm$^{-1}$ above that of the terbium ion in order to avoid back-energy transfer. For that reason, a large amount of development work is needed to find suitable ligands that firstly have suitable energy levels and secondly have Tb complexes that simultaneously have other properties important for the safeguarding of documents of value, for example sufficient lightfastness and visual brightness. Known Tb complexes are usually excitable only in short-wave UV light below a wavelength of λ=350 nm and/or, by virtue of their low quantum yield or low lightfastness, are unsuitable for use as a luminescent security feature.

It is an object of the present invention to provide an organometallic security feature having good lightfastness that luminesces on excitation with radiation in the UV-A range, with luminescence emission in the visible wavelength range, especially with green and/or red light.

SUMMARY OF THE INVENTION 1. (First aspect of the invention) A security feature for safeguarding a document of value, comprising an organometallic luminescent substance which, on excitation with radiation in the UV-A range, has emission of radiation in the visible wavelength range, especially with green and/or red light, wherein the luminescent substance is based on a polynuclear, preferably dinuclear, heteroleptic lanthanoid complex of the formula (I)

$$[M_x(NN\ ligand)_a(OO\ ligand)_b] \qquad (I)$$

where x, a and b are natural numbers, where x≥2, a≥2 and b≥6;
M is a lanthanoid selected from the group consisting of Eu and Tb;
the OO ligand is a ligand of the formula (II) that coordinates via oxygen atoms:

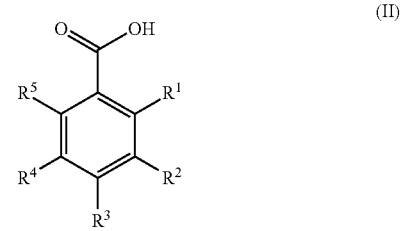

where $R_1$ to $R_5$ are the same or different and are independently selected from the group consisting of hydrogen atom, —OH, —OCH$_3$ and halogen atom;

the NN ligand is a nitrogen ligand with a phenanthroline base skeleton of the general formula (III) or of the general formula (IV)

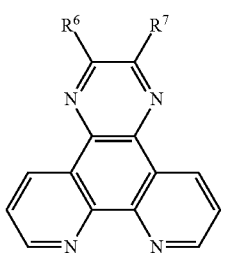

(III)

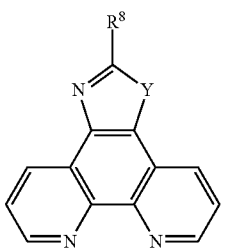

(IV)

where

Y is N—$R_9$ or Y is an oxygen atom;

$R_6$ and $R_7$ are the same or different and are independently selected from the group consisting of hydrogen atom and an electron-donating group;

$R_8$ and $R_9$ are the same or different and are independently selected from the group consisting of hydrogen atom, substituted or unsubstituted alkyl radical having 1 to 8 carbon atoms, substituted or unsubstituted aryl radical, substituted or unsubstituted piperidine radical and substituted or unsubstituted benzyl radical.

2. (Preferred configuration) The security feature according to clause 1, wherein the indices x, a and b in the formula (I) are subject to the relationships x=2, a=2 and b=6, i.e. the luminescent substance is based on a dinuclear heteroleptic lanthanoid complex of the formula (V)

$$[M_2(NN\ ligand)_2(OO\ ligand)_6] \quad (V)$$

3. (Preferred configuration) The security feature according to clause 1 or 2, wherein the lanthanoid M in the formula (I) or in the formula (V) is the element Tb.

4. (Preferred configuration) The security feature according to clause 1, 2 or 3, wherein, in the formula (III), $R_6$ and $R_7$ are the same or different and are independently an electron-donating group, namely an alkyl radical having 1 to 6 carbon atoms, preferably a cyclic alkyl radical having 5 or 6 carbon atoms, especially preferably cyclohexyl.

5. (Preferred configuration) The security feature according to any of clauses 1 to 4, wherein, in the case that $R_6$, $R_7$, $R_8$ and/or $R_9$ is/are independently an alkyl radical, the alkyl radical is a branched or unbranched alkyl chain having 1 to 8 carbon atoms, especially methyl, ethyl, propyl, butyl, pentyl, hexyl, heptyl, octyl, neopentyl or isopropyl, where the alkyl chain may optionally be substituted by one or more fluorine atoms and is especially a $CF_3$ group, a $CHF_2$ group, a $CH_2F$ group, a $C_2F_5$ group, a $CH_2(CF_3)$ group or a $CF_2CF_2CF_3$ group.

6. (Preferred configuration) The security feature according to any of clauses 1 to 5, wherein, in the case that $R_8$ and/or $R_9$ is/are independently an aryl radical, the aryl radical is selected from the group consisting of a phenyl group and a phenyl radical having 6 to 10 carbon atoms, where the phenyl group or the phenyl radical may optionally be substituted by one or more fluorine atoms or hydroxyl groups, especially 2-fluorophenyl, perfluorophenyl or 2-hydroxyphenyl.

7. (Preferred configuration) The security feature according to any of clauses 1 to 5, wherein, in the case that $R_8$ and/or $R_9$ is independently a benzyl radical, the benzyl radical has 7 to 10 carbon atoms and may optionally be substituted by one or more fluorine atoms, for example perfluorobenzyl.

8. (Preferred configuration) The security feature according to any of clauses 1 to 5, wherein, in the case that $R_8$ and/or $R_9$ is/are independently a piperidine radical, the piperidine radical is a piperidine radical substituted by alkyl substituents, preferably a 2,2,6,6-tetramethylpiperidine radical. A 2,2,6,6-tetramethylpiperidine radical is a HALS (hindered amine light stabilizer) absorber that can reduce photochemical degradation in an advantageous manner via the neutralization of harmful photochemical radicals (called free radicals).

9. (Preferred configuration) The security feature according to any of clauses 1 to 8, wherein the NN ligand is a nitrogen ligand having a phenanthroline base skeleton according to the general formula (IV) where Y is N—$R_9$. The associated advantage lies in excitability at $\lambda$=365 nm.

10. (Preferred configuration) The security feature according to clause 9, wherein $R_9 \neq H$. Substitution in the $R_9$ position advantageously has the effect that lightfastness is higher than for the complex with the same OO ligand and unsubstituted NN ligand, i.e. $R_9$=H.

11. (Preferred configuration) The security feature according to any of clauses 1 to 10, wherein $R_9$ is an alkyl radical, tetramethylpiperidine radical or perfluorobenzyl radical, preferably an unsubstituted alkyl radical having 1 to 8 carbon atoms. A tetramethylpiperidine radical or perfluorobenzyl radical are preferred because they show the best lightfastness with regard to all the examples. Alkyl substituents are preferred because the complexes having alkyl-substituted ligands of the formula (IV) show good lightfastness and the highest luminescence intensity compared to the other substituents. The higher luminescence intensity can be attributed to steric effects of the long alkyl chains that better prevent stacking of the molecules.

12. (Preferred configuration) The security feature according to any of clauses 1 to 11, wherein M=Tb and, in the formula (IV), the selection is Y=N—$R_9$ and $R_8$=H. The selection is preferred because it leads to extremely high lightfastness.

13. (Preferred configuration) The security feature according to clause 12, wherein $R_9 \neq H$. This variant is advantageous because, in combination with $R_8$=H, lightfastness is extremely high. Substitution in the $R_9$ position has the effect that lightfastness is higher than for the complex with the same OO ligand and unsubstituted NN ligand (i.e. $R_8$=H and $R_9$=H).

14. (Preferred configuration) The security feature according to clause 12, wherein $R_9$ is an alkyl radical, tetramethylpiperidine radical or perfluorobenzyl radical, preferably an unsubstituted alkyl radical having 1 to 8 carbon atoms.

15. (Preferred configuration) The security feature according to any of clauses 1 to 14, wherein the OO ligand is present either as a chelate-forming ligand or as a bridging ligand between different metal centers. The wording "the OO ligand is present as a chelate-forming ligand" should be understood such that the two oxygen atoms of the bidentate acid group coordinate to the same metal center. This variant is associated with the advantage that the spatial proximity of the metal centers results in lower back-energy transfer (BET) to the ligands.

16. (Preferred configuration) The security feature according to any of clauses 1 to 14, wherein the radicals of the OO ligand are chosen such that one of the five radicals is a methoxy group and the remaining four radicals are independently selected from the group consisting of hydrogen atom, —OH, —OCH$_3$ and halogen atom. This variant is advantageous because voluminous carboxylate ligands, for example methoxybenzoates, in complexes of the formula (V) force distortions of the Ln coordination polyhedron, which results in advantageous effects on the electronic energy levels of the ligands and hence a reduction in BET and hence an increase in luminescence intensity.

17. (Preferred configuration) The security feature according to any of clauses 1 to 14, wherein the radicals of the OO ligand are chosen such that the OO ligand corresponds to a 2-methoxybenzoic acid, a 3-methoxybenzoic acid or a 4-methoxybenzoic acid. This variant is associated with the advantage of a distinct increase in luminescence.

18. (Preferred configuration) The security feature according to any of clauses 1 to 14, wherein the radicals of the OO ligand are chosen such that $R_5$ is a hydrogen atom, $R_1=R_3=R_4$ and each correspond to a hydrogen atom or a fluorine atom, and $R_2$ is a methoxy radical. This variant is advantageous in that a methoxy substituent in the meta position leads to dinuclear complexes having a higher luminescence intensity than in the para position.

19. (Preferred configuration) The security feature according to any of clauses 1 to 14, wherein the radicals of the OO ligand are chosen such that the OO ligand corresponds to a salicylic acid derivative. This variant is advantageous in that voluminous carboxylate ligands, especially salicylic acid, in complexes of the formula (V) force distortions of the Ln coordination polyhedron, which results in advantageous effects on the electronic energy levels of the ligands and hence a reduction in BET and hence an increase in luminescence intensity.

20. (Second aspect of the invention) A process for producing the security feature according to any of clauses 1 to 19, comprising:
a) the providing of a solution of a metal salt comprising the lanthanoid M as cation, where M is selected from the group consisting of Eu and Tb;
b) the providing of a solution of the deprotonated acid of the OO ligand of the formula (II)

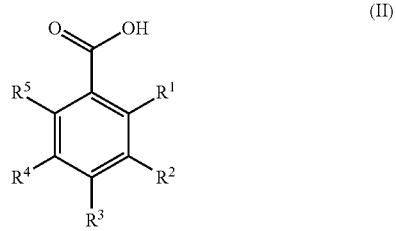

(II)

where
$R_1$ to $R_5$ are the same or different and are independently selected from the group consisting of hydrogen atom, —OH, —OCH$_3$ and halogen atom;
c) the providing of a solution of the NN ligand of the general formula (III) or of the general formula (IV)

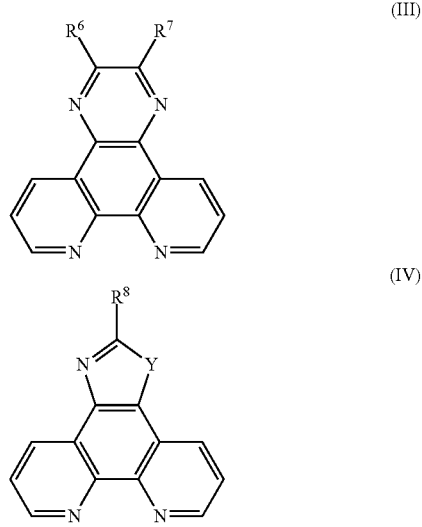

where
Y is N—$R_9$ or Y is an oxygen atom;
$R_6$ and $R_7$ are the same or different and are independently selected from the group consisting of hydrogen atom and an electron-donating group;
$R_8$ and $R_9$ are the same or different and are independently selected from the group consisting of hydrogen atom, substituted or unsubstituted alkyl radical having 1 to 8 carbon atoms, substituted or unsubstituted aryl radical, substituted or unsubstituted piperidine radical and substituted or unsubstituted benzyl radical;
d) the step of blending the solutions obtained in steps a), b) and c).

21. (Third aspect of the invention) A printing ink for the printing of a document of value, wherein the printing ink comprises the security feature according to any of clauses 1 to 19.

22. (Fourth aspect of the invention) A document of value, comprising the security feature according to any of clauses 1 to 19.

23. (Preferred configuration) The document of value according to clause 22, wherein the document of value is a banknote.

24. (Fifth aspect of the invention) A process for producing the document of value according to clause 22 or 23, comprising
the providing of a substrate for the document of value;
the printing of the substrate of the document of value with a printing ink comprising the security feature according to any of clauses 1 to 19.

DETAILED DESCRIPTION OF THE PREFERRED EMBODIMENTS

The present invention provides a luminescent organometallic security feature which is excitable in the UV-A range, has high lightfastness and emits in the visible wavelength range, especially with green and/or red light. The security feature is colorless in visible light, but has absorption within the ultraviolet wavelength range. On excitation by ultraviolet excitation light, preferably with an illumination maximum of $\lambda=365$ nm, the compounds of the invention have intense emission in the green and/or red spectral region.

The green spectral region is especially understood to mean emission in the range of $\lambda=500\text{-}560$ nm, preferably with an emission maximum in the range of $\lambda=535\text{-}555$ nm. The red spectral region is especially understood to mean emission in the range of $\lambda=600\text{-}700$ nm, preferably with an emission maximum in the range of $\lambda=600\text{-}625$ nm.

Radiation in the UV-A range is understood herein to mean the wavelength range of $\lambda=315\text{-}380$ nm.

The abbreviation "Ln" as used, for example, in the term "Ln coordination polyhedron" stands for lanthanoid.

The security feature of the invention is especially a phosphorescent security feature.

The security feature comprises a polynuclear, preferably dinuclear, heteroleptic terbium or europium complex having ligands that coordinate via oxygen (referred to herein as "OO ligand") and ligands that coordinate via nitrogen (referred to herein as "NN ligand"), according to the following formula (I):

[M$_x$(NN ligand)$_a$(OO ligand)$_b$]  (I)

where M is a lanthanoid selected from Eu or Tb, and where the NN ligand comprises a phenanthroline base skeleton, namely a substituted or unsubstituted tetraazatriphenylene of the formula (III) or phenanthrolineimidazole of the formula (IV), where the OO ligand comprises a substituted benzoic acid (formula (II)):

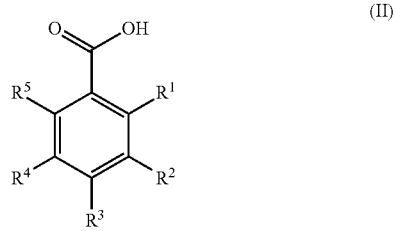

(II)

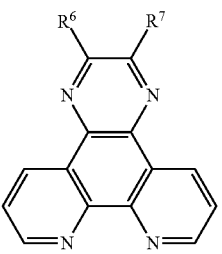

(III)

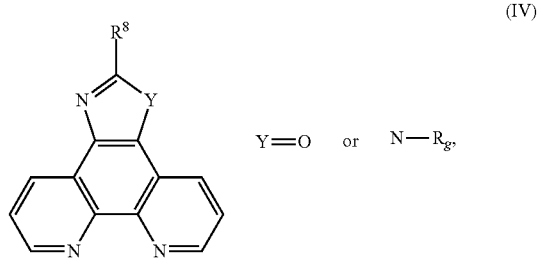

(IV)

The indices x, a and b are natural numbers, where the following relationships are applicable:

$x \geq 2$, preferably $x=2$;

$a \geq 2$, preferably $a=2$;

$b \geq 6$, preferably $b=6$;

in particular: $b/a=3$.

The security feature preferably comprises dinuclear heteroleptic terbium or europium complexes having OO and NN ligands of the following formula (V):

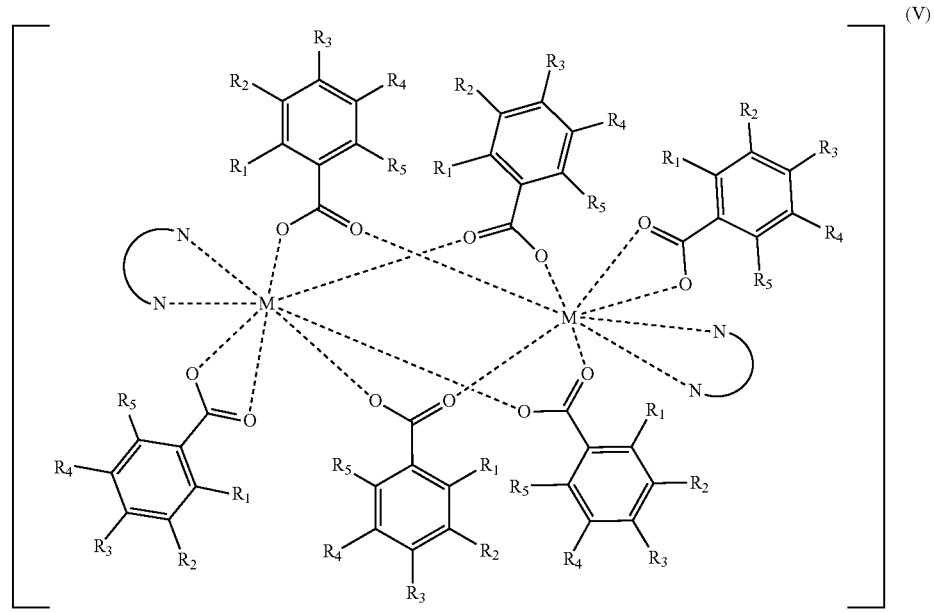

(V)

The NN ligand comprises a phenanthroline base skeleton, namely a substituted or unsubstituted tetraazatriphenylene of the formula (III) or phenanthrolineimidazole of the formula (IV). The OO ligand comprises a substituted benzoic acid of the formula (II). These polynuclear compounds surprisingly have distinctly improved lightfastness compared to the known mononuclear complexes having the same NN ligands that are excitable in the UV-A range (see example 1).

The bridging OO ligand is responsible for good lightfastness and high luminescence intensity because it brings the lanthanoid metal centers into mutual spatial proximity and hence reduces the probability of energy back-transfer from the metal (or metal center) to the ligand or reduces energy loss via radiationless deactivation (or vibronic relaxation) (see example 1).

It is surprising here that only those complexes that bear an OO ligand of the formula (II) have all the desired properties. Other known OO ligands having, for example, two carboxyl groups, for example 3,4,5,6-tetrafluorophthalic acid or 2,3,5,6-tetrafluoroterephthalic acid, but also heteroaromatic carboxylic acids, for example 1H-benzimidazole-2-carboxylic acid, in combination with NN ligands of the formula (III) or of the formula (IV), give rise to complexes having low lightfastness (see example 2).

The choice of the NN ligand can influence the excitation spectrum of the luminescent compound. Extension of the conjugated π electron system in the NN ligand by comparison with phenanthroline has effects on the excitation spectrum of the dinuclear complexes. As a result of the increased wealth of electrons from phenanthroline through tetraazatriphenylene (see formula (III)) to phenanthrolineimidazoles (see formula (IV)), a bathochromic shift in the excitation spectrum takes place (see example 4). Even by virtue of the introduction of specific substituents $R_6$ and $R_7$ in the ligand of the formula (III) or $R_8$ in the ligand of the formula (IV), the excitation spectrum can be bathochromically shifted, which improves luminescence intensity under illumination with ultraviolet light, preferably with an illumination maximum of $\lambda$=365 nm (see example 4 and example 5).

The possibility of adjusting the excitation spectrum to particular wavelength ranges is sensible and advantageous because, depending on the field of use of the security feature, a different excitation wavelength is preferred and, in particular, different UV light sources are used.

UV light wavelengths used for verification of documents, for example passports, ID documents or other travel documents, but also banknotes and driving licenses, are, for example, $\lambda$=254 nm, 313 nm, 365 nm and 400 nm.

In addition, lightfastness in dinuclear complexes of the general formula (V) having nitrogen ligands of the formula (IV) is adjustable via the substituents $R_8$ and $R_9$ (see example 5). If the ligand is substituted on the nitrogen (i.e. $R_9 \neq H$), lightfastness is surprisingly improved. At the same time, the $R_9$ substituent has no significant effect on the excitation spectrum, but influences the level of lightfastness. Substitution of the NN ligand of the formula (IV) in the 2 position (i.e. $R_8 \neq H$) can lead to lowering of lightfastness (e.g. $R_8$=alkyl, see example 5), but has the advantage that the excitation spectrum can be shifted even further into the bathochromic region, which means that the corresponding security feature is also suitable for devices with excitation wavelengths at $\lambda$=400 nm. For M=Eu and $R_8$=aryl, the excitation spectrum even reaches up to $\lambda$=422 nm.

By virtue of the use of polynuclear terbium or europium complexes with the abovementioned ligands, by comparison with the prior art, it is firstly possible to increase lightfastness and secondly to match the excitation spectrum to the application.

Documents of value in the context of the invention are articles such as banknotes, cheques, shares, tokens, ID cards, passes, credit cards, certificates and other documents, labels, seals, and articles to be safeguarded, for example CDs, packaging and the like. The preferred field of use is banknotes, which are especially based on a paper substrate.

BRIEF DESCRIPTION OF THE DRAWINGS

Further working examples of the invention and advantages of the invention are elucidated in detail hereinafter with reference to the figures, wherein the representation dispenses with reproduction to scale and in proportion, in order to increase clarity.

The figures show.

DETAILED DESCRIPTION OF VARIOUS EMBODIMENTS

1.1 Material and Methods

Figure 1:
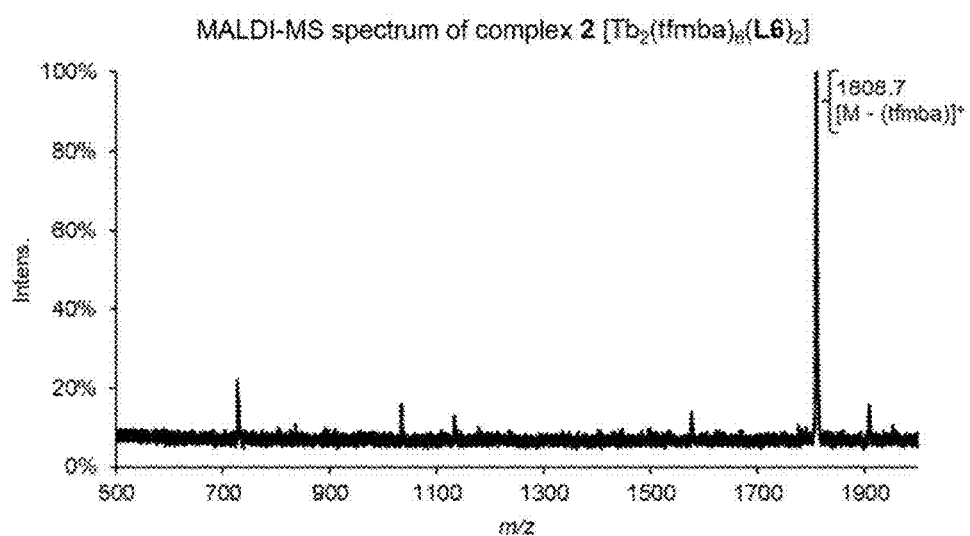
FIG. 1 the MALDI-TOF mass spectrum of complex 2, measured in linear mode (matrix DCTB, +)

The techniques used for the identification of the compounds are as follows:

Evidence that the complexes of the invention are dinuclear was found by MALDI-TOF mass spectrometry (matrix-assisted laser desorption ionization). The mass spectra were recorded with an UltraFlex ToF/ToF (Bruker Daltonics). An N2 laser with wavelength 337 nm and pulse duration 3 ns was used. In linear mode the device achieves a resolution of >8000 FWHM, in reflectron mode a resolution of >20000 FWHM. The matrix used was DCTB (2-[(2E)-3-(4-tert-butylphenyl)-2-methylprop-2-enylidene]malononitrile). Mass calibration was effected immediately before sample analysis using polystyrene (Ag adduct).

For all luminescent substances used in the examples, the emission spectra of the luminescent substances were measured with the aid of a Horiba Fluo-MAX 4 spectrometer.

The wool scale test, also referred to later on as light test, is conducted analogously to EN ISO 105-B01:1999 in a Q-Lab xenon test chamber (Q-SUN Xe-2-H). For this purpose, the respective luminescence intensity of the prints is measured quantitatively prior to irradiation with the aid of a Horiba Fluo-MAX 4 spectrometer and normalized to 100%. The remaining residual luminescence intensity is assessed after the attainment of the wool scale points. Depending on the absorption properties of the complexes, an excitation wavelength in the UV-A range between $\lambda_{ex}$=315 nm and $\lambda_{ex}$=365 nm was chosen for the measurements of lightfastness. Since the residual intensities of the prints, measured at different excitation wavelengths, differ by less than 10 percentage points at all wool scale points under consideration, the lightfastness of the compounds of the invention is considered to be independent of excitation wavelength.

For visual assessment of the luminescence of the luminescent complexes and prints produced, a Vilber Lourmat VL-6.LC filtered handheld UV lamp with two switchable wavelengths ($\lambda$=254 nm and 365 nm) was used. Luminescence color is independent of wavelength.

The chemicals and reagents used were sourced from the following companies and used without further purification: 2,4,5-trifluoro-3-methoxy-benzoic acid (tfmba, Sigma-Aldrich), 3-methoxybenzoic acid (3-moba, Sigma-Aldrich), 4-methoxybenzoic acid (4-moba, Sigma-Aldrich), terbium (III) chloride hexahydrate (Sigma-Aldrich), terbium(III) nitrate pentahydrate (Auer-Remy), 1,10-phenanthroline-5,6-dione (phen-dione, abcr), 1,10-phenanthroline (phen, Merk), 1H-benzimidazole-2-carboxylic acid (HBIC, Sigma-Aldrich), 2,3,5,6-tetrafluoroterephthalic acid (TFTP, abcr), 4-sulfobenzoic acid monopotassium salt (4-SBA, Sigma-Aldrich).

1.2 Preparation of the Ligands of the Formula (III)

The ligands of the formula (III), dipyrido[3,2-f:2',3'-h]quinoxaline (L6), 2-methyldipyrido[3,2-f:2'3'-h]quinoxaline (L11), cis-2,3-cyclohexane-dipyrido[3,2-f:2',3'-h]quinoxaline (L8) and 2,3-dicyanodipyrido[3,2-f:2',3'-h]quinoxaline (L7), were prepared analogously to example 3 of publication WO 98/049163 A1. L7 is a noninventive ligand since R6 and R7 are formed by electron-withdrawing groups.

1.3 Preparation of the Ligands of the Formula (IV)

1.3.1 Synthesis of 1H-imidazo[4,5-f][1,10] phenanthroline (L1)

1,10-Phenanthroline-5,6-dione (28.617 g, 0.136 mol) was suspended in 430 ml of acetic acid and heated to 110° C. in an oil bath. Ammonium acetate (210 g, 2.72 mol) was added to the reaction solution in solid form. Then paraformaldehyde (5.720 g, 0.190 mmol) was added to the brown/orange reaction solution in solid form. The reaction mixture was stirred at 110° C. for 4 h. After cooling to room temperature, the solution was added to 200 ml of ice-water, and ammonium hydroxide solution was added until pH=7 was obtained (exothermic). In the course of this, the product precipitates out gradually. The precipitated solids were filtered off and washed with water. Drying in a drying cabinet at 60° C. gave L1 as a light ocher powder (26.99 g, 0.123 mol, 90%).

Scheme 1 below shows the synthesis of 1H-imidazo[4,5-f][1,10]-phenanthroline (L1).

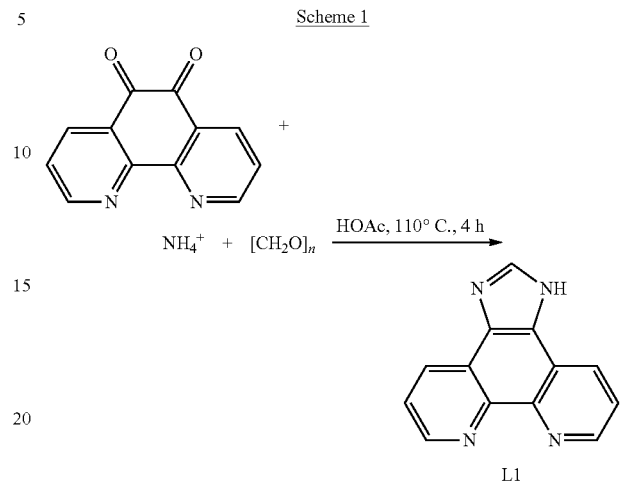

Scheme 1

1.3.2 General Method for Preparation of the N-Substituted Ligands of the Formula (IV) ($R_8$=H, $R_9 \neq$H)

Variant a) for Synthesis of Ligands L4, L5, L9 and L10

1,10-Phenanthroline-5,6-dione (1 equivalent) was suspended in acetic acid (2-8 ml per mmol of phen-dione). Paraformaldehyde (1.4 equivalents), ammonium acetate (1 equivalent) and the correspondingly $R_9$-substituted amine—see scheme 2—(1.2 equivalents) were added. The reaction mixture was stirred at 90° C.-110° C. for 2-5 hours. After the reaction mixture had been cooled, ammonium hydroxide was added until pH=7 was obtained (exothermic). The precipitated solids were filtered off and washed with water. The dried crude product was suspended in ethyl acetate and filtered again. Recrystallization gave the target product as a colorless solid.

Scheme 2 below shows the synthesis of the phenanthrolineimidazole derivatives L4, L5, L9 and L10 according to variant a).

Scheme 2

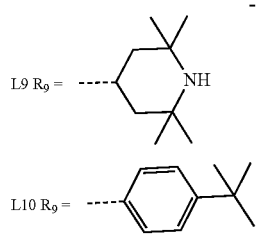

L9 R9 =

L10 R9 =

Variant b) for Synthesis of Ligands L2 and L3

L1 (1 equivalent) was suspended in DMSO (10-30 ml per mmol of L1), and solid sodium hydroxide (1.2 equivalents) was added. After stirring at 30° C.-55° C. for 1 h, the correspondingly R9-substituted bromide—see scheme 3—(1.3 equivalents) was added and the mixture was stirred at 30° C.-55° C. for a further 5 h. The reaction mixture was added to ice-water, in the course of which a pale beige solid precipitated out over time. The precipitated solid was filtered and washed with water. After recrystallization of the crude product in DCM/hexane, the target compound was obtained as a colorless powder.

Scheme 3 below shows the synthesis of the phenanthrolineimidazole derivatives L2 and L3 according to variant b).

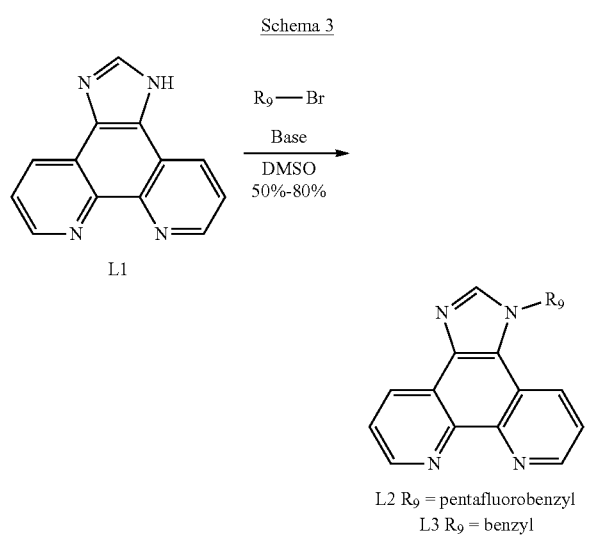

Schema 3

L2 R9 = pentafluorobenzyl
L3 R9 = benzyl

1.3.3 General Method for Preparation of the 2-Substituted Ligands of the Formula (IV) L12 and L14 (R8≠H, R9=H)

1,10-Phenanthroline-5,6-dione (1 equivalent) was suspended in acetic acid (10-20 ml per mmol of phen-dione), ammonium hydroxide solution (15-20 equivalents) was added and the mixture was stirred at room temperature until the solution was clear. Subsequently, the appropriate aldehyde—see scheme 4—(1.2 equivalents) was added in solid form. The reaction mixture was stirred at 110° C. for 1-4 h. After cooling to 0° C., ammonium hydroxide solution was added to the reaction mixture until pH=7 was obtained (exothermic). The precipitated solids were filtered off and washed with water. After drying in a drying cabinet at 60° C., the target compound was obtained as a yellow or cream-colored powder.

Scheme 4 below shows the synthesis of the phenanthrolineimidazole derivatives L12 and L14.

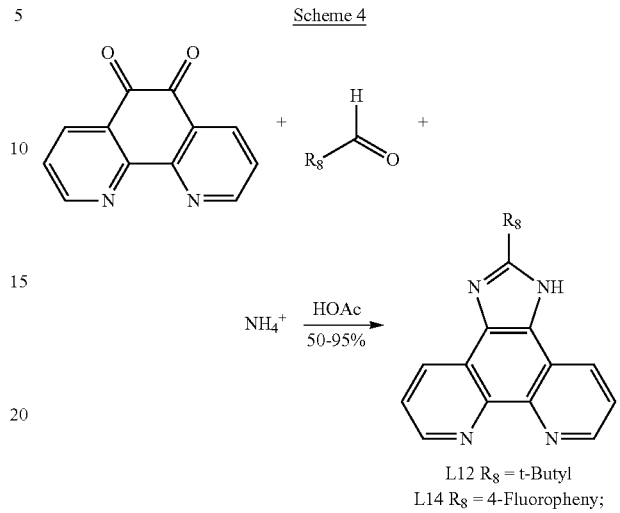

Scheme 4

L12 R8 = t-Butyl
L14 R8 = 4-Fluoropheny;

1.4 General Method for Preparation of the Dinuclear Complexes

All the above-described ligands were used to prepare dimeric heteroleptic terbium complexes. Two molecules of the nitrogen ligand and six molecules of the OO ligand react here with two trivalent terbium centers. For this purpose, the OO ligand was suspended in water, and the same number of moles of base (NaOH) was added. The nitrogen ligand was added to the mixture as a solution in ethanol. The metal salt terbium chloride hexahydrate was slowly added dropwise to the reaction solution as a solution in a water/ethanol mixture (1:1). This resulted in a colorless precipitate. After stirring within a temperature range of 50° C.-90° C. for 1-4 hours, the reaction mixture was cooled down to room temperature. The precipitated solids were filtered off, washed with water and dried in a drying cabinet at 60° C. The green-luminescing compounds remained as a colorless powder. In the same way, it is possible to obtain red-luminescing europium complexes using europium chloride hexahydrate.

Figure 2:
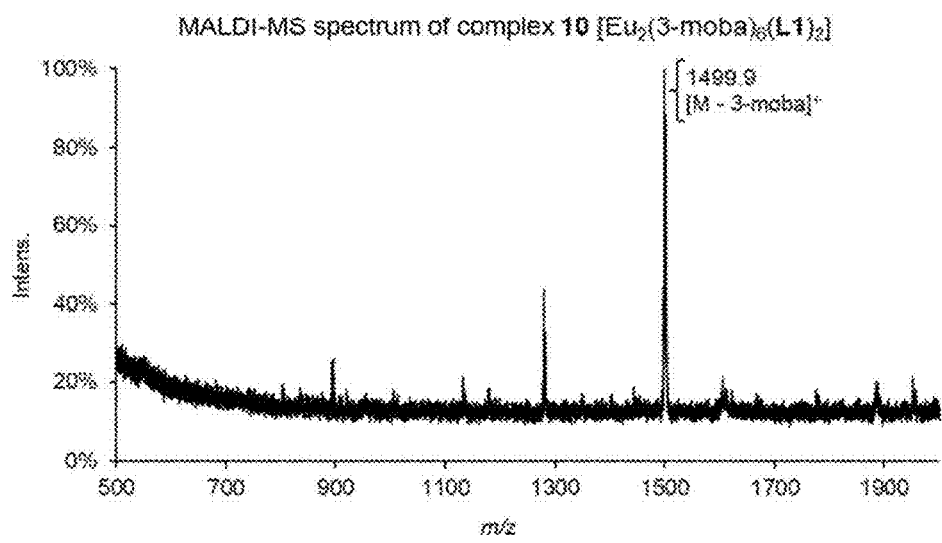
FIG. 2 the MALDI-TOF mass spectrum of complex 10, measured in linear mode (matrix DCTB, +)

Evidence that the complexes of the invention are dinuclear was found representatively using the complexes 2, 3, 5, 7b, 7c, 10 and 17b by MALDI-TOF mass spectrometry. In all mass spectra, the main signal found was the respective molecular ion peak of a dinuclear complex of the formula (V) minus an OO ligand (referred to as [M-OO ligand]+). The loss of one or more ligands occurs during ionization and is not untypical of coordination complexes. Signals at m/z ratios that would correspond to the mononuclear complexes were not observed in any of the spectra, even allowing for the loss of one or more ligands. By way of example, FIGS. 1 and 2 show the spectra of complexes 2 and 10.

1.5 Production of the Printing Inks and Prints Thereof

The complexes can be incorporated into printing ink and used directly as security features. In order to improve the printing properties, it is alternatively possible to encapsulate the dyes beforehand (core-shell pigments), as described in WO 2017/080656 A1. Processing in the polymer has only a minor effect on the properties discussed in this invention such as lightfastness (variations in the relative intensities of the wool scale points of fewer than 5 percentage points) or on the excitation spectra. Therefore, no distinction is made hereinafter between encapsulated and unencapsulated luminescent substances, and the luminescent compounds are instead referred to generally as luminescent substances.

For production of printing inks, the luminescent substances 2, 3, 4, 5, 7a, 7b, 7c, 9, 10, 15, 16a, 16b, 17a, 17b, 18, 19, 20, 21, 25 (inventive) and 1, 6a, 6b, 8, 11, 12, 13, 14a, 14b, 26 (noninventive) were each incorporated into an offset printing ink (Sicpa Holding SA) with the aid of an Engelsmann JEL 25/53 pigment muller (built in 2013). The degree of pigmentation in each of the green- or red-luminescing inks was 15 percent by weight.

The printing inks were printed onto security paper with an ink weight per unit area of 1 g/m², and the prints were dried at 60° C. for 2 h. The prints are referred to hereinafter correspondingly as prints 1-26.

1.6 Inventive Complexes/Prints

1.6.1 Complex/Print 2: [Tb$_2$(Tfmba)$_6$(L6)$_2$]

Complex 2 was prepared by the general method for preparation of dimeric complexes proceeding from a solution of 2,4,5-trifluoro-3-methoxybenzoic acid (1.129 g, 5.48 mmol) and sodium hydroxide (219 mg, 5.48 mmol) in 20 ml of water, ligand L6 (424 mg, 1.82 mmol) as a solution in 25 ml of ethanol and terbium chloride hexahydrate (681 mg, 1.82 mmol) as a solution in a water/ethanol mixture (1:1) at 60° C. Yield: 78%. MS/MALDI (DCTB, positive): m/z (isotope peak) (%)=1806.9 (100) [M—tfmba]$^+$ calc. for [C$_{68}$H$_{36}$F$_{15}$N$_8$O$_{15}$Tb$_2$]$^+$=1807.1

Print 2 under illumination with UV light of wavelengths $\lambda_{ex}$=240 nm to $\lambda_{ex}$=356 nm has green emission with an emission maximum of $\lambda_{em}$=545 nm.

1.6.2 Complex/Print 3: [Tb$_2$(3-moba)$_6$(L6)$_2$]

Complex 3 was prepared by the general method for preparation of dimeric complexes proceeding from a solution of 3-methoxybenzoic acid (963 mg, 6.33 mmol) and sodium hydroxide (253 mg, 6.33 mmol) in 25 ml of water, ligand L6 (490 mg, 2.11 mmol) as a solution in 25 ml of ethanol and terbium chloride hexahydrate (787 mg, 2.11 mmol) as a solution in a water/ethanol mixture (1:1) at 70° C. Yield: 87%. MS/MALDI (DCTB, positive): m/z (isotope peak) (%)=1537.2 (100) [M-3-moba]$^+$ calc. for [C$_{68}$H$_{51}$N$_8$O$_{15}$Tb$_2$]$^+$=1537.2

Print 3 under illumination with UV light of wavelengths $\lambda_{ex}$=240 nm to $\lambda_{ex}$=356 nm has green emission with an emission maximum of $\lambda_{em}$=545 nm.

1.6.3 Complex/Print 4: [Tb$_2$(tfmba)$_6$(L11)$_2$]

Complex 4 was prepared by the general method for preparation of dimeric complexes proceeding from a solution of 2,4,5-trifluoro-3-methoxybenzoic acid (1.352 g, 6.55 mmol) and sodium hydroxide (262 mg, 6.55 mmol) in 40 ml of water, ligand L11 (514 mg, 2.18 mmol) as a solution in 50 ml of ethanol and terbium chloride hexahydrate (817 mg, 2.18 mmol) as a solution in a water/ethanol mixture (1:1) at 60° C. Yield: 77%.

Print 4 under illumination with UV light of wavelengths $\lambda_{ex}$=240 nm to $\lambda_{ex}$=356 nm has green emission with an emission maximum of $\lambda_{em}$=545 nm.

1.6.4 Complex/Print 5: [Tb$_2$(tfmba)$_6$(L8)$_2$]

Complex 5 was prepared by the general method for preparation of dimeric complexes proceeding from a solution of 2,4,5-trifluoro-3-methoxybenzoic acid (880 mg, 4.26 mmol) and sodium hydroxide (171 mg, 4.26 mmol) in 40 ml of water, ligand L8 (408 mg, 1.42 mmol) as a solution in 50 ml of ethanol and terbium chloride hexahydrate (531 mg, 1.42 mmol) as a solution in a water/ethanol mixture (1:1) at 90° C. Yield: 86%. MS/MALDI (DCTB, positive): m/z (isotope peak) (%)=1915.2 (100) [M-tfmba]$^+$ calc. for [C$_{76}$H$_{48}$F$_{15}$N$_8$O$_{15}$Tb$_2$]$^+$=1915.2

Print 5 under illumination with UV light of wavelengths $\lambda_{ex}$=240 nm to $\lambda_{ex}$=363 nm has green emission with an emission maximum of $\lambda_{em}$=545 nm.

1.6.5 Complexes/Prints 7a/b/c: [Tb$_2$(OO Ligand)$_6$(L1)$_2$]

7a) OO ligand=tfmba, 7b) OO ligand=3-moba, 7c) OO ligand=4-moba

Complex 7a was prepared by the general method for preparation of dimeric complexes proceeding from a solution of 2,4,5-trifluoro-3-methoxybenzoic acid (675 mg, 3.27 mmol) and sodium hydroxide (131 mg, 3.27 mmol) in 20 ml of water, ligand L1 (241 mg, 1.09 mmol) as a solution in 50 ml of ethanol and terbium chloride hexahydrate (408 mg, 1.09 mmol) as a solution in a water/ethanol mixture (1:1) at 70° C. Yield: 74%.

Print 7a under illumination with UV light of wavelengths $\lambda_{ex}$=240 nm to $\lambda_{ex}$=398 nm has green emission with an emission maximum of $\lambda_{em}$=544 nm.

Complex 7b was prepared by the general method for preparation of dimeric complexes proceeding from a solution of 3-methoxybenzoic acid (701 mg, 4.61 mmol) and sodium hydroxide (184 mg, 4.61 mmol) in 20 ml of water, ligand L1 (338 mg, 1.53 mmol) as a solution in 60 ml of ethanol and terbium chloride hexahydrate (573 mg, 1.53 mmol) as a solution in a water/ethanol mixture (1:1) at 60° C. Yield: 71%. MS/MALDI (DCTB, positive): m/z (isotope peak) (%)=1513.5 (100) [M–3-moba]$^+$ calc. for [C$_{66}$H$_{51}$N$_8$O$_{15}$Tb$_2$]$^+$=1513.2

Print 7b under illumination with UV light of wavelengths $\lambda_{ex}$=240 nm to $\lambda_{ex}$=397 nm has green emission with an emission maximum of $\lambda_{em}$=544 nm.

Complex 7c was prepared by the general method for preparation of dimeric complexes proceeding from a solution of 4-methoxybenzoic acid (1.94 g, 12.8 mmol) and 12.8 ml of 1 N aqueous sodium hydroxide solution in 100 ml of water, ligand L1 (937 mg, 4.26 mmol) as a solution in 200 ml of ethanol and terbium chloride hexahydrate (1.59 g, 4.26 mmol) as a solution in a water/ethanol mixture (1:1) at 70° C. Yield: 59%. MS/MALDI (DCTB, positive): m/z (isotope peak) (%)=1513.4 (100) [M-4-moba]$^+$ calc. for [C$_{66}$H$_{51}$N$_8$O$_{15}$Tb$_2$]$^+$=1513.2

Print 7c under illumination with UV light of wavelengths $\lambda_{ex}$=240 nm to $\lambda_{ex}$=395 nm has green emission with an emission maximum of $\lambda_{em}$=545 nm.

1.6.6 Complex/Print 9: [Eu$_2$(Tfmba)$_6$(L6)$_2$]

Complex 9 was prepared by the general method for preparation of dimeric complexes proceeding from a solution of 2,4,5-trifluoro-3-methoxybenzoic acid (944 mg, 4.58 mmol) and sodium hydroxide (183 mg, 4.58 mmol) in 20 ml of water, ligand L6 (354 mg, 1.53 mmol) as a solution in 60 ml of ethanol and europium chloride hexahydrate (550 mg, 1.53 mmol) as a solution in a water/ethanol mixture (1:1) at 70° C. Yield: 95%.

Print 9 under illumination with UV light of wavelengths $\lambda_{ex}$=240 nm to $\lambda_{ex}$=356 nm has red emission with an emission maximum of $\lambda_{em}$=612 nm.

1.6.7 Complex/Print 10: [Eu$_2$(3-Moba)$_6$(L1)$_2$]

Complex 10 was prepared by the general method for preparation of dimeric complexes proceeding from a solution of 3-methoxybenzoic acid (831 mg, 5.46 mmol) and sodium hydroxide (218 mg, 5.46 mmol) in 10 ml of water, ligand L1 (400 mg, 1.82 mmol) as a solution in 150 ml of ethanol and europium chloride hexahydrate (667 mg, 1.82 mmol) as a solution in a water/ethanol mixture (1:1) at 70° C. Yield: 70%. MS/MALDI (DCTB, positive): m/z (isotope peak) (%)=1499.2 (100) [M–3-moba]$^+$ calc. for [C$_{66}$H$_{51}$Eu$_2$N$_8$O$_{15}$]$^+$=1499.2

Print 10 under illumination with UV light of wavelengths $\lambda_{ex}$=240 nm to $\lambda_{ex}$=398 nm has red emission with an emission maximum of $\lambda_{em}$=611 nm.

1.6.8 Complex/Print 15: [Tb$_2$(3-Moba)$_6$(L2)$_2$]

Complex 15 was prepared by the general method for preparation of dimeric complexes proceeding from a solution of 3-methoxybenzoic acid (202 mg, 1.33 mmol) and 2.4 ml of 1 N aqueous sodium hydroxide solution in 3 ml of water, ligand L2 (177 mg, 0.44 mmol) as a solution in 16 ml of ethanol and terbium chloride hexahydrate (165 mg, 0.44 mmol) as a solution in a water/ethanol mixture (1:1) at 60° C. Yield: 75%.

Print 15 under illumination with UV light of wavelengths $\lambda_{ex}$=240 nm to $\lambda_{ex}$=391 nm has green emission with an emission maximum of $\lambda_{em}$=545 nm.

1.6.9 Complexes/Prints 16a/b: [Tb$_2$(OO Ligand)$_6$(L3)$_2$]

16a) OO ligand=tfmba, 16b) OO ligand=3-moba

Complex 16a was prepared by the general method for preparation of dimeric complexes proceeding from a solution of 2,4,5-trifluoro-3-methoxybenzoic acid (2.87 g, 13.9 mmol) and 13.9 ml of 1 N aqueous sodium hydroxide solution in 4 ml of water, ligand L3 (1.44 g, 4.65 mmol) as a solution in 40 ml of ethanol and terbium chloride hexahydrate (1.74 g, 4.65 mmol) as a solution in a water/ethanol mixture (1:1) at 60° C. Yield: 95%.

Print 16a under illumination with UV light of wavelengths $\lambda_{ex}$=240 nm to $\lambda_{ex}$=395 nm has green emission with an emission maximum of $\lambda_{em}$=545 nm.

Complex 16b was prepared in the same way with 3-methoxybenzoic acid (735 mg, 4.83 mmol) as OO ligand. Yield: 85%.

Print 16b under illumination with UV light of wavelengths $\lambda_{ex}$=240 nm to $\lambda_{ex}$=396 nm has green emission with an emission maximum of $\lambda_{em}$=545 nm.

1.6.10 Complexes/prints 17a/b: [Tb$_2$(OO ligand)$_6$(L4)$_2$]

17a) OO ligand=tfmba, 17b) OO ligand=3-moba

Complex 17a was prepared by the general method for preparation of dimeric complexes proceeding from a solution of 2,4,5-trifluoro-3-methoxybenzoic acid (835 mg, 4.05 mmol) and 4 ml of 1 N aqueous sodium hydroxide solution in 20 ml of water, ligand L4 (373 mg, 1.35 mmol) as a solution in 80 ml of ethanol and terbium chloride hexahydrate (504 mg, 1.35 mmol) as a solution in a water/ethanol mixture (1:1) at 80° C. Yield: 86%.

Print 17a under illumination with UV light of wavelengths $\lambda_{ex}$=240 nm to $\lambda_{ex}$=396 nm has green emission with an emission maximum of $\lambda_{em}$=545 nm.

Complex 17b was prepared by the general method for preparation of dimeric complexes proceeding from a solution of 3-methoxybenzoic acid (2.93 g, 19.2 mmol) and 19.2 ml of 1 N aqueous sodium hydroxide solution in 30 ml of water, ligand L4 (1.77 g, 6.4 mmol) as a solution in 100 ml of ethanol and terbium chloride hexahydrate (2.39 g, 6.4 mmol) as a solution in a water/ethanol mixture (1:1) at 70° C. Yield: 95%. MS/MALDI (DCTB, positive): m/z (isotope peak) (%)=1625.2 (100) [M–3-moba]$^+$ calc. for [C$_{74}$H$_{67}$N$_8$O$_{15}$Tb$_2$]$^+$=1625.3

Print 17b under illumination with UV light of wavelengths $\lambda_{ex}$=240 nm to $\lambda_{ex}$=397 nm has green emission with an emission maximum of $\lambda_{em}$=545 nm.

1.6.11 Complex/Print 18: [Tb$_2$(3-moba)$_6$(L5)$_2$]

Complex 18 was prepared by the general method for preparation of dimeric complexes proceeding from a solution of 3-methoxybenzoic acid (1.04 g, 6.85 mmol) and 6.85 ml of 1 N aqueous sodium hydroxide solution in 20 ml of water, ligand L5 (759 mg, 2.28 mmol) as a solution in 50 ml of ethanol and terbium chloride hexahydrate (852 mg, 2.28 mmol) as a solution in a water/ethanol mixture (1:1) at 60° C. Yield: 66%.

Print 18 under illumination with UV light of wavelengths $\lambda_{ex}$=240 nm to $\lambda_{ex}$=397 nm has green emission with an emission maximum of $\lambda_{em}$=545 nm.

1.6.12 Complex/Print 19: [Tb$_2$(3-moba)$_6$(L9)$_2$]

Complex 19 was prepared by the general method for preparation of dimeric complexes proceeding from a solution of 3-methoxybenzoic acid (2.08 g, 13.6 mmol) and 13.6 ml of 1 N aqueous sodium hydroxide solution in 10 ml of water, ligand L9 (1.63 g, 4.54 mmol) as a solution in 30 ml of ethanol and terbium chloride hexahydrate (1.70 g, 4.54 mmol) as a solution in a water/ethanol mixture (1:1) at 60° C. Yield: 48%.

Print 19 under illumination with UV light of wavelengths $\lambda_{ex}$=240 nm to $\lambda_{ex}$=400 nm has green emission with an emission maximum of $\lambda_{em}$=545 nm.

1.6.13 Complex/Print 20: [Tb$_2$(3-moba)$_6$(L10)$_2$]

Complex 20 was prepared by the general method for preparation of dimeric complexes proceeding from a solution of 3-methoxybenzoic acid (2.52 g, 16.5 mmol) and 16.5 ml of 1 N aqueous sodium hydroxide solution in 13 ml of water, ligand L10 (1.95 g, 5.51 mmol) as a solution in 55 ml of ethanol and terbium chloride hexahydrate (2.06 g, 5.51 mmol) as a solution in a water/ethanol mixture (1:1) at 60° C. Yield: 87%.

Print 20 under illumination with UV light of wavelengths $\lambda_{ex}$=240 nm to $\lambda_{ex}$=392 nm has green emission with an emission maximum of $\lambda_{em}$=545 nm.

1.6.14 Complex/Print 21: [Tb$_2$(tfmba)$_6$(L12)$_2$]

Complex 21 was prepared by the general method for preparation of dimeric complexes proceeding from a solution of 2,4,5-trifluoro-3-methoxybenzoic acid (1.0154 g, 4.93 mmol) and sodium hydroxide (197 mg, 4.93 mmol) in 25 ml of water, L12 (454 mg, 1.64 mmol) as a solution in 100 ml of ethanol and terbium chloride hexahydrate (613 mg, 1.64 mmol) as a solution in a water/ethanol mixture (1:1) at 70° C. Yield: 74%.

Print 21 under illumination with UV light of wavelengths $\lambda_{ex}$=240 nm to $\lambda_{ex}$=414 nm has green emission with an emission maximum of $\lambda_{em}$=545 nm.

1.6.15 Complex/Print 25: [Eu$_2$(3-moba)$_6$(L14)$_2$]

Complex 25 was prepared by the general method for preparation of dimeric complexes proceeding from a solution of 3-methoxybenzoic acid (217 mg, 1.43 mmol) and sodium hydroxide (57 mg, 1.43 mmol) in 15 ml of water, ligand L14 (150 mg, 0.48 mmol) as a solution in 40 ml of ethanol and europium chloride hexahydrate (176 mg, 0.48 mmol) as a solution in a water/ethanol mixture (1:1) at 80° C. Yield: 25%.

Print 25 under illumination with UV light of wavelengths $\lambda_{ex}$=240 nm to $\lambda_{ex}$=433 nm has green emission with an emission maximum of $\lambda_{em}$=614 nm.

1.7 Noninventive Complexes/Prints

1.7.1 Complex/Print 1 (Mononuclear; no OO Ligand): [Tb(L6)$_2$Cl$_3$]

Ligand L6 (928 mg, 3.99 mmol) was suspended in 320 ml of acetonitrile and heated to 80° C. Terbium chloride hexahydrate (745 mg, 1.99 mmol) was added to the reaction solution in solid form, and the reaction mixture was heated to reflux for 12 h. After cooling to room temperature, a colorless precipitate flocculated out. The precipitated solid was filtered off, washed with water and then dried. 1.34 g of complex 1 was obtained.

Print 1 under illumination with UV light of wavelengths $\lambda_{ex}$=240 nm to $\lambda_{ex}$=360 nm has green emission with an emission maximum of $\lambda_{em}$=543 nm.

1.7.2 Complex/Print 26 (Mononuclear; no OO Ligand): [Eu(L6)$_2$Cl$_3$]

Ligand L6 (300 mg, 1.29 mmol) was suspended in 150 ml of acetonitrile and heated to 80° C. Europium chloride hexahydrate (236 mg, 0.65 mmol) was added to the reaction solution in solid form, and the reaction mixture was heated to reflux for 4 h. After cooling to room temperature, a colorless precipitate flocculated out. The precipitated solid was filtered off, washed with water and then dried. 400 mg of complex 26 was obtained.

Print 26 under illumination with UV light of wavelengths $\lambda_{ex}$=240 nm to $\lambda_{ex}$=371 nm has green emission with an emission maximum of $\lambda_{em}$=615 nm.

1.7.3 Complexes/Prints 14a/b (Mononuclear, no OO Ligand): 14a [Tb(L1)$_3$] and 14b [Tb(L1)$_2$Cl]

Ligand L1 (445 mg, 2.02 mmol) was suspended in a mixture of 20 ml of water and 25 ml of EtOH, and aqueous 1 N NaOH solution was added until the ligand dissolved. Terbium chloride hexahydrate (251 mg, 0.672 mmol) was added to the reaction solution in solid form, and the reaction mixture was heated at 80° C. for 3 h. 480 mg of complex 14a was obtained. Complex 14b was prepared in the same way with a ligand/metal salt ratio of 2:1.

Prints 14a and 14b do not show any visually perceptible luminescence under illumination with UV light.

1.7.4 Complexes/prints 6a/b (NN ligand does not conform to formula (III) or (IV)): [Tb$_2$(OO ligand)$_6$ (phen)$_2$] (phen=1,10-phenanthroline)

6a) OO ligand=tfmba, 6b) OO ligand=3-moba

Complex 6a was prepared by the general method for preparation of dimeric complexes proceeding from a solution of 2,4,5-trifluoro-3-methoxybenzoic acid (1.043 g, 5.06 mmol) and sodium hydroxide (202 mg, 5.06 mmol) in 30 ml of water, 1,10-phenanthroline (303 mg, 1.69 mmol) as a solution in 30 ml of ethanol and terbium chloride hexahydrate (631 mg, 1.69 mmol) as a solution in a water/ethanol mixture (1:1) at 90° C. Yield: 63%.

Print 6a under illumination with UV light of wavelengths $\lambda_{ex}$=240 nm to $\lambda_{ex}$=335 nm has green emission with an emission maximum of $\lambda_{em}$=544 nm.

Complex 6b was prepared by the general method for preparation of dimeric complexes proceeding from a solution of 3-methoxybenzoic acid (2.612 g, 17.16 mmol) and sodium hydroxide (686 mg, 17.16 mmol) in 80 ml of water, 1,10-phenanthroline (1.031 g, 5.72 mmol) as a solution in 100 ml of ethanol and terbium chloride hexahydrate (2.137 mg, 5.72 mmol) as a solution in a water/ethanol mixture (1:1) at 60° C. Yield: 90%.

Print 6b under illumination with UV light of wavelengths $\lambda_{ex}$=240 nm to $\lambda_{ex}$=336 nm has green emission with an emission maximum of $\lambda_{em}$=544 nm.

1.7.5 Complex/Print 8 (NN Ligand of the Formula (III), but with Electron-Withdrawing Radicals R$_{6/7}$): [Tb$_2$(tfmba)$_6$(L7)$_2$]

Complex 8 was prepared by the general method for preparation of dimeric complexes proceeding from a solution of 2,4,5-trifluoro-3-methoxybenzoic acid (415 mg, 2.01 mmol) and sodium hydroxide (80 mg, 2.01 mmol) in 40 ml of water, ligand L7 (192 mg, 0.67 mmol) as a solution in 100 ml of ethanol and terbium chloride hexahydrate (251 mg, 0.67 mmol) as a solution in a water/ethanol mixture (1:1) at 60° C.

Print 8 does not show any visually perceptible luminescence under illumination with UV light.

1.7.6 Complex/Print 11 (OO Ligand does not Conform to Formula (II)): [Tb$_2$(HBIC)$_6$(L6)$_2$]

Complex 11 was prepared by the general method for preparation of dimeric complexes proceeding from a solution of 1H-benzimidazole-2-carboxylic acid (518 mg, 3.19 mmol) and 3.19 ml of 1 N aqueous sodium hydroxide solution, ligand L6 (247 mg, 1.06 mmol) as a solution in 30 ml of ethanol and terbium chloride hexahydrate (398 mg, 1.06 mmol) as a solution in a water/ethanol mixture (1:1) at 70° C. Yield: 76%.

Print 11 under illumination with UV light of wavelengths $\lambda_{ex}$=240 nm to $\lambda_{ex}$=372 nm has green emission with an emission maximum of $\lambda_{em}$=543 nm.

1.7.7 Complex/Print 12 (OO Ligand does not Conform to Formula (II)): [Tb$_2$(TFTP)$_3$(L1)$_2$]

2,3,5,6-Tetrafluoroterephthalic acid (964 mg, 4.05 mmol) was suspended in 100 ml of water, and 8.1 ml of 1 N aqueous sodium hydroxide solution was added. Ligand L1 (446 mg, 2.02 mmol) was added as a solution in 105 ml of ethanol and the reaction solution was heated to 100° C. Terbium chloride hexahydrate (756 mg, 2.025 mmol) was slowly added dropwise as a solution in a water/ethanol mixture (1:1) and the reaction solution was stirred at 100° C. for 30 min and then at room temperature overnight. The precipitated solid was filtered off, washed with water and then dried. Yield: 75%.

Print 12 under illumination with UV light of wavelengths $\lambda_{ex}$=240 nm to $\lambda_{ex}$=403 nm has green emission with an emission maximum of $\lambda_{em}$=544 nm.

1.7.8 Complex/Print 13 (OO Ligand does not Conform to Formula (II)): [Tb$_2$(4-SBA)$_3$(L1)$_2$]

4-Sulfobenzoic acid monopotassium salt (704 mg, 2.93 mmol) was suspended in 10 ml of water, and 3.9 ml of 1 N aqueous sodium hydroxide solution was added. Ligand L1 (431 mg, 1.95 mmol) was added as a solution in 20 ml of water and 40 ml of ethanol. Terbium(III) nitrate pentahydrate (850 mg, 1.95 mmol), dissolved in 10 ml of water, was slowly added dropwise and the reaction solution was stirred at room temperature for 6 h. The precipitated solid was filtered, washed with water and then dried. Yield: 77%.

Print 13 under illumination with UV light of wavelengths $\lambda_{ex}$=240 nm to $\lambda_{ex}$=408 nm has green emission with an emission maximum of $\lambda_{em}$=545 nm.

2. Tabular Overview of the Prints

TABLE 1

Position of excitation spectra and remaining residual intensities of luminescence after the attainment of the wool scale points (lightfastness) of illustrative dimeric Tb and Eu complexes with different OO and NN ligands.

| Designation | Lanthanoid | OO ligand | NN ligand | Band edge of excitation spectrum (25% int.)/nm | WS0 | WS1 | WS2 | WS3 | WS4 |
|---|---|---|---|---|---|---|---|---|---|
| inventive | | | | | | | | | |
| Print 2 | Tb | tfmba | L6 | 348 | 100% | 88% | 85% | 78% | 63% |
| Print 3 | Tb | 3-moba | L6 | 349 | 100% | 89% | 83% | 75% | 61% |
| Print 4 | Tb | tfmba | L11 | 351 | 100% | 80% | 76% | 74% | 58% |
| Print 5 | Tb | tfmba | L8 | 358 | 100% | 81% | 75% | 63% | 46% |
| Print 7a | Tb | tfmba | L1 | 388 | 100% | 73% | 63% | 46% | 32% |
| Print 7b | Tb | 3-moba | L1 | 386 | 100% | 69% | 58% | 47% | 31% |
| Print 7c | Tb | 4-moba | L1 | 378 | 100% | 62% | 53% | 43% | 31% |
| Print 9 | Eu | tfmba | L6 | 348 | 100% | 94% | 85% | 70% | 72% |
| Print 10 | Eu | 3-moba | L1 | 388 | 100% | 96% | 97% | 88% | 79% |
| noninventive | | | | | | | | | |
| Print 1 | Tb | — | L6 | 353 | 100% | 59% | 47% | 37% | 26% |
| Print 26 | Eu | — | L6 | 360 | 100% | 69% | 60% | 54% | 43% |
| Print 14a/b | Tb | — | L1 | | no luminescence | | | | |
| Print 6a | Tb | tfmba | phen | 313 | 100% | 97% | 92% | 89% | 79% |
| Print 6b | Tb | 3-moba | phen | 325 | 100% | 99% | 93% | 83% | 75% |
| Print 8 | Tb | tfmba | L7 | | no luminescence | | | | |
| Print 11 | Tb | HBIC | L6 | 363 | 100% | 25% | | | |
| Print 12 | Tb | TFTP | L1 | 397 | 100% | 48% | 40% | 31% | 23% |
| Print 13 | Tb | 4-SBA | L1 | 396 | 100% | 39% | 31% | 27% | 22% |

TABLE 2

Position of excitation spectra and remaining residual intensities of luminescence after the attainment of the wool scale points (lightfastness) of illustrative dimeric Tb and Eu complexes with NN ligands of the formula (IV).

| Designation | Lanthanoid | OO ligand | NN ligand | R$^8$ | R$^9$ | Band edge of excitation spectrum (25% int.)/nm | WS0 | WS1 | WS2 | WS3 | WS4 |
|---|---|---|---|---|---|---|---|---|---|---|---|
| inventive | | | | | | | | | | | |
| Print 15 | Tb | 3-moba | L2 | H | pentafluorobenzyl | 376 | 100% | 89% | 85% | 77% | 65% |
| Print 16a | Tb | tfmba | L3 | H | benzyl | 385 | 100% | 76% | 73% | 61% | 47% |
| Print 16b | Tb | 3-moba | L3 | H | benzyl | 385 | 100% | 97% | 93% | 79% | 61% |
| Print 17a | Tb | tfmba | L4 | H | n-butyl | 385 | 100% | 79% | 72% | 61% | 48% |
| Print 17b | Tb | 3-moba | L4 | H | n-butyl | 385 | 100% | 80% | 74% | 64% | 46% |
| Print 18 | Tb | 3-moba | L5 | H | n-octyl | 385 | 100% | 88% | 77% | 66% | 50% |

TABLE 2-continued

Position of excitation spectra and remaining residual intensities of luminescence after the attainment of the wool
scale points (lightfastness) of illustrative dimeric Tb and Eu complexes with NN ligands of the formula (IV).

| Designation | Lanthanoid | OO ligand | NN ligand | $R^8$ | $R^9$ | Band edge of excitation spectrum (25% int.)/ nm | WS0 | WS1 | WS2 | WS3 | WS4 |
|---|---|---|---|---|---|---|---|---|---|---|---|
| Print 19 | Tb | 3-moba | L9 | H | HALS* | 390 | 100% | 81% | 77% | 70% | 61% |
| Print 20 | Tb | 3-moba | L10 | H | p-tert-butyl-phenyl | 381 | 100% | 87% | 85% | 66% | 18% |
| Print 21 | Tb | tfmba | L12 | tert-butyl | H | 402 | 100% | 65% | 55% | 39% | 24% |
| Print 25 | Eu | 3-moba | L14 | 4-fluoro-phenyl | H | 422 | 100% | 94% | 87% | 79% | 63% |

*2,2,6,6-tetramethylpiperidine

3. Example 1: Comparison of Mononuclear and Dinuclear Complexes

Figure 3:
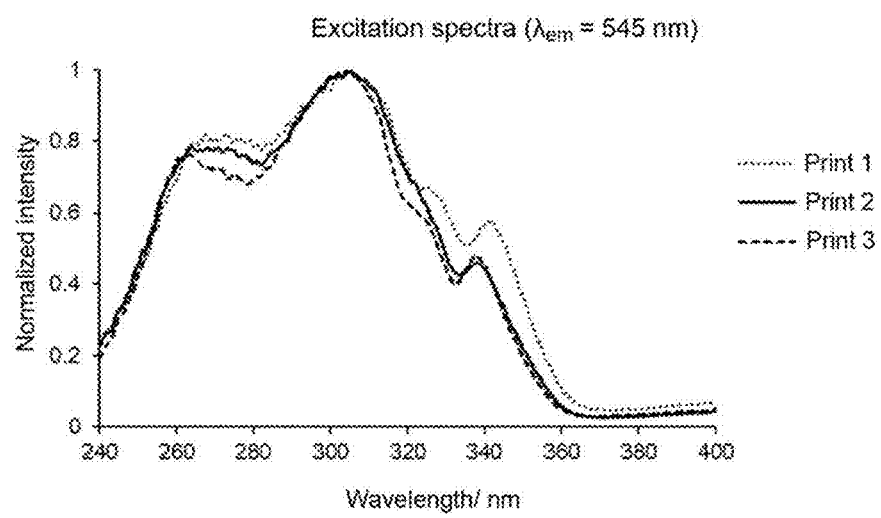
FIG. 3 the excitation spectrum of prints 1, 2 and 3, measured at an emission maximum of $\lambda_{em}$=545 nm.

By virtue of the provision of inventive dinuclear complexes (prints 2 and 3) by comparison with a mononuclear terbium complex (print 1) each having the same nitrogen ligands, an improvement is surprisingly found in lightfastness without significant effects on the excitation spectrum (see FIG. 3). It is possible here to use OO ligands of the formula (II), preferably 3-methoxybenzoic acid, 4-methoxybenzoic acid, 2,4,5-trifluoro-3-methoxybenzoic acid or salicylic acid.

FIG. 3 shows the excitation spectrum of prints 1, 2 and 3, measured at an emission maximum of $\lambda_{em}$=545 nm.

This behavior is independent of the lanthanoid used. The dinuclear europium complex (print 9) shows distinctly better lightfastness compared to the mononuclear complex having the same NN ligand L6 (print 26).

In addition, it is a feature of the luminescent substances of the invention that the use of the bridging OO ligands brings the lanthanoid metal centers spatially close to one another, and hence reduces the probability of energy back-transfer from the metal (metal center) to the ligand or energy loss via radiationless deactivation (vibronic relaxation). It is thus possible to utilize particular NN ligands as sensitizers that do not have efficient energy transfer to the metal center without OO co-ligands.

The mononuclear Tb complexes 14a and 14b with L1 as NN ligand do not show any visually perceptible luminescence under illumination with UV light. However, the inventive dinuclear complexes 7a and 7b with the same NN ligand (L1) luminesce in the green under illumination with UV light.

4. Example 2: Comparison of different OO ligands

If noninventive OO ligands are used in dinuclear complexes (complexes 11-13), the prints have lower lightfastness than the dinuclear complexes with the corresponding NN ligands and inventive OO ligands (complexes 2, 3 and 7).

5. Example 3: Comparison of different NN ligands

The excitation spectrum is influenced by the choice of NN ligand. Thus, an increase in 71 electron density by extension of the conjugated π electron system in the NN ligand (cf. print 6 (counterexample), print 2/3 (extension of the π electron system with electron-deficient heterocycle) and print 7 (extension of the π electron system with electron-rich heterocycle) lead to a shift in the excitation spectrum into the bathochromic wavelength range. A bathochromic shift in the excitation spectrum within the UV-A range is desirable since most document testing devices are equipped with UV light sources having an illumination maximum at λ=365 nm. The inventive prints 2/3 and 7, by contrast with the noninventive print 6, are excitable in the UV-A range (see FIG. 4). The type of OO ligand (3-moba, 4-moba or tfmba) and the metal center (prints 9 and 10, Eu rather than Tb) have no effect on the position of the excitation spectrum.

Figure 4:
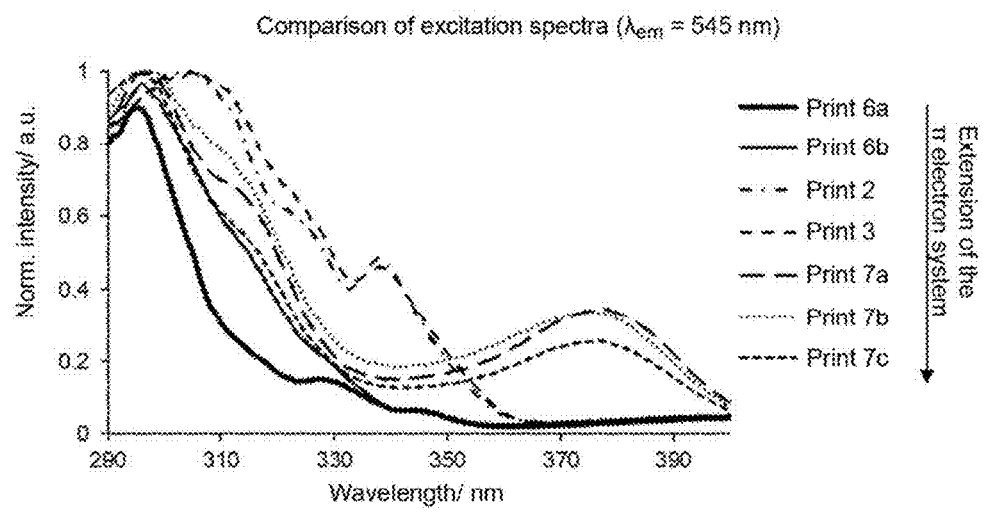
FIG. 4 comparison of the excitation spectra of the dimeric terbium complexes with tfmba (2, 6a, 7a), 3-moba (3, 6b, 7b) and 4-moba (7c) as OO ligand, measured at an emission maximum of $\lambda_{em}$=545 nm.

FIG. 4 shows the comparison of the excitation spectra of the dimeric terbium complexes with tfmba (2, 6a, 7a), 3-moba (3, 6b, 7b) and 4-moba (7c) as OO ligand, measured at an emission maximum of $\lambda_{em}$=545 nm.

6. Example 4: Comparison of Different Substituents $R_6$ and $R_7$

It is a feature of the luminescent substances of the invention that the introduction of specific substituents $R_6$ and $R_7$ having an electron-donating effect can shift the excitation spectrum into the bathochromic region. With, for example, $R_6$=H and $R_7$=methyl (print 4) or $R_6$ and $R_7$ combined to form a 6-membered cyclohexyl radical (print 5), the excitation maximum in the UV-A range is at λ=343 nm (print 4) or at λ=350 nm (print 5). By comparison, the excitation maximum of print 2 with $R_6$=$R_7$=H is at λ=338 nm.

Figure 5:
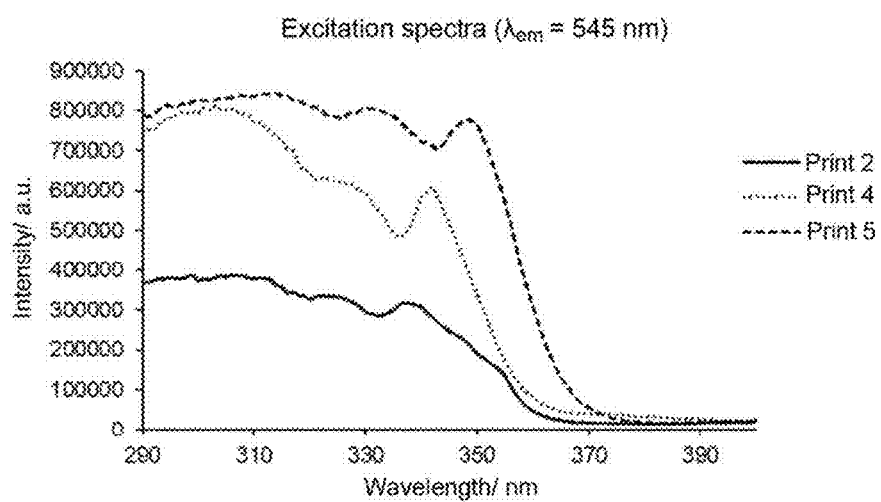
FIG. 5 excitation spectra ($\lambda_{em}$=545 nm) of prints 2, 4 and 5.

FIG. 5 shows excitation spectra ($\lambda_{em}$=545 nm) of prints 2, 4 and 5.

As well as the shift in the excitation spectrum, a further surprising effect has occurred. To wit, the visual brightness of the luminescence of the prints increases from 2 through 4 to 5. This is illustrated by the spectrally integrated excitation spectra of the individual prints (λ=240 nm-400 nm). The excitation spectra measured are spectrally integrated here in order to obtain a measure of visual brightness. Since the emission maximum is the same for all luminescent spectra, this was chosen for measurement of the excitation spectra. The visual brightness of prints 4 and 5 was divided by the visual brightness of the reference print (print 2) in order to obtain the relative visual brightness of prints 4 and 5.

Figure 6:
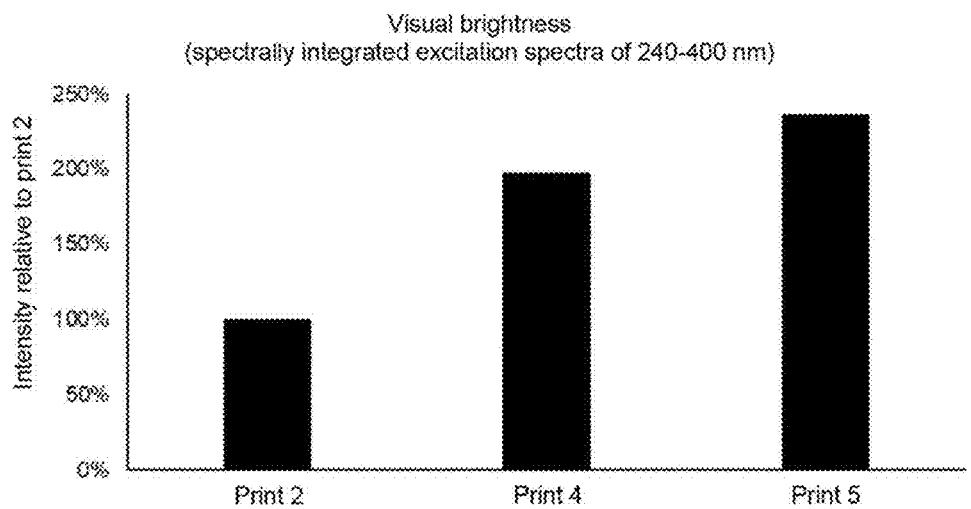
FIG. 6 the visual brightness of prints 2, 4 and 5.

FIG. 6 shows visual brightness of prints 2, 4 and 5.

If the ligand of the formula (III) is substituted by electron-withdrawing radicals (not in accordance with the invention, e.g. $R_{6/7}$=CN (ligand L7)—complex 8) rather than with electron-donating radicals as in example 3 (complexes 4 and 5), the dimeric complexes do not luminesce. The yellow-brown solid of the [$Tb_2(tfmba)_6(L7)_2$] form (complex 8)

obtained after the synthesis, under illumination with UV light, does not show any visually perceptible luminescence.

For the inventive compounds, $R_6$ and $R_7$ must comprise electron-donating radicals, for example alkyl chains.

7. Example 5: Comparison of Different Substituents $R_8$ and $R_9$

It is possible via the choice of substituents $R_8$ and $R_9$ of the dinuclear complexes of the general formula (V) having NN ligands of the formula (IV) to vary properties such as lightfastness and excitability of the luminescent substances. Lightfastness is adjustable via the choice of substituent $R_9$. The excitation spectrum can be influenced via the choice of substituent $R_8$.

If the ligand of the formula (IV) is substituted on the nitrogen ($R_9 \neq H$), lightfastness is surprisingly distinctly improved compared to the complex with an unsubstituted NN ligand (prints 15-20 by comparison with prints 7a/b). It is also possible to adjust the quality of lightfastness by choice of the $R_9$ substituent (WS4 between 46% and 65%). The $R_9$ substituent has no significant effect on the excitation spectrum (see FIGS. 7 and 8).

Figure 9:
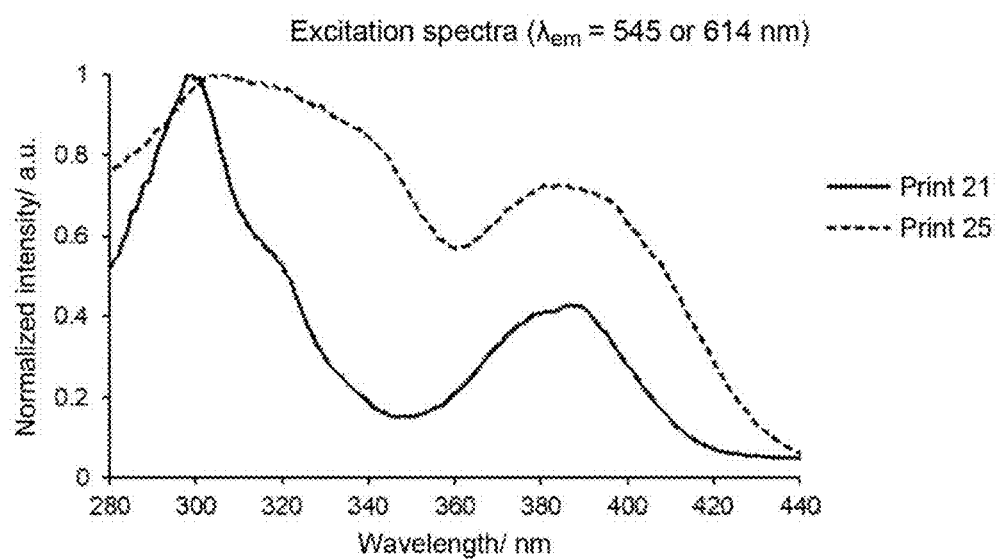
FIG. 9 excitation spectra of prints 21 and 25, NN ligand of the formula (IV) with $R_9$=H and $R_8 \neq H$, measured at an emission maximum of $\lambda_{em}$=545 nm and 614 nm.

This is different in the case of substitution in the 2 position ($R_8$): it is possible here depending on the choice of substituent to achieve distinct broadening of the excitation band into the bathochromic region (see FIG. 9, prints 21 and 25). However, no positive effect on lightfastness was observed here.

Figure 7:
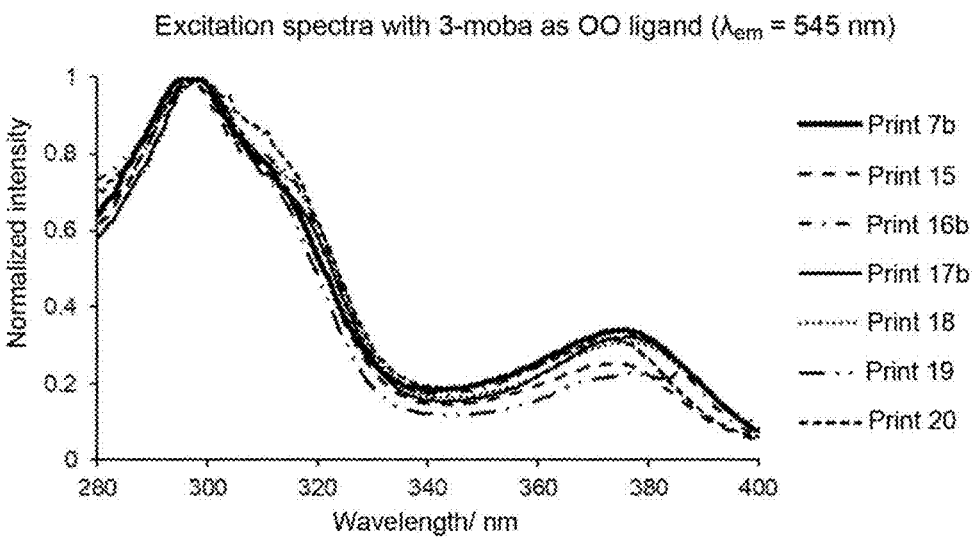
FIG. 7 comparison of the excitation spectra of the dimeric terbium complexes with 3-moba as OO ligand, NN ligand of the formula (IV) with $R_8$=H and different $R_9$ radicals, measured at an emission maximum of $\lambda_{em}$=545 nm.

FIG. 7 shows the comparison of the excitation spectra of the dimeric terbium complexes with 3-moba as OO ligand, NN ligand of the formula (IV) with $R_8$=H and different $R_9$ radicals, measured at an emission maximum of $\lambda_{em}$=545 nm.

Figure 8:
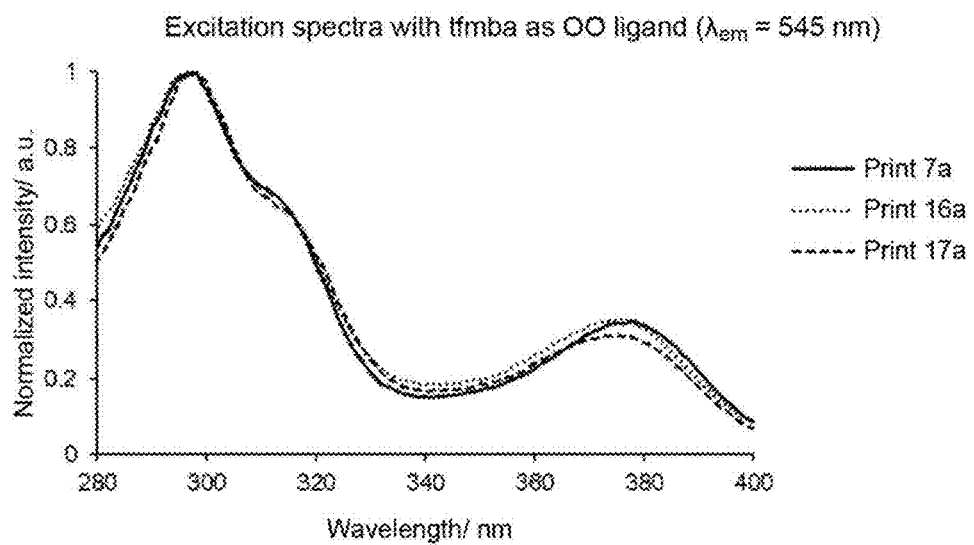
FIG. 8 comparison of the excitation spectra of the dimeric terbium complexes with tfmba as OO ligand, NN ligand of the formula (IV) with $R_8$=H and different $R_9$ radicals, measured at an emission maximum of $\lambda_{em}$=545 nm.

FIG. 8 shows the comparison of the excitation spectra of the dimeric terbium complexes with tfmba as OO ligand, NN ligand of the formula (IV) with $R_8$=H and different $R_9$ radicals, measured at an emission maximum of $\lambda_{em}$=545 nm.

FIG. 9 shows excitation spectra of prints 21 and 25, NN ligand of the formula (IV) with $R_9$=H and $R_8 \neq H$, measured at an emission maximum of $\lambda_{em}$=545 nm or 614 nm.

The invention claimed is:

1. A security feature for safeguarding a document of value, comprising an organometallic luminescent substance which, on excitation with radiation in a UV-A range, has emission of radiation in a visible wavelength range, wherein the luminescent substance is based on a polynuclear heteroleptic lanthanoid complex of the formula (I)

[Mx(NN ligand)a(OO ligand)b]  (I)

where x, a and b are natural numbers, where x≥2, a≥2 and b≥6;

M is a lanthanoid selected from the group consisting of Eu and Tb;

the OO ligand is a ligand of the formula (II) that coordinates via oxygen atoms:

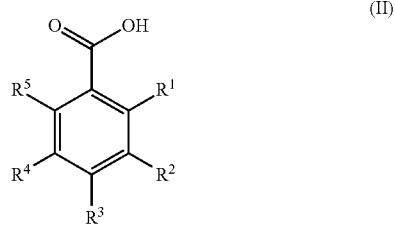

where

R1 to R5 are the same or different and are independently selected from the group consisting of hydrogen atom, OH, OCH3 and halogen atom;

the NN ligand is a nitrogen ligand with a phenanthroline base skeleton of the general formula (III) or of the general formula (IV)

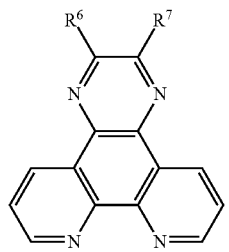

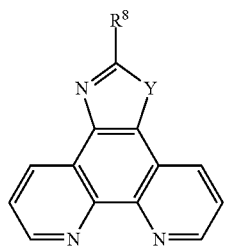

where

Y is NR9 or Y is an oxygen atom;

R6 and R7 are the same or different and are independently selected from the group consisting of hydrogen atom and an electron-donating group;

R8 and R9 are the same or different and are independently selected from the group consisting of hydrogen atom, substituted or unsubstituted alkyl radical having 1 to 8 carbon atoms, substituted or unsubstituted aryl radical, substituted or unsubstituted piperidine radical and substituted or unsubstituted benzyl radical.

2. The security feature according to claim 1, wherein the indices x, a and b in the formula (I) are subject to the relationships x=2, a=2 and b=6, in a dinuclear heteroleptic lanthanoid complex of the formula (V)

[M2(NN ligand)2(OO ligand)6]  (V).

3. The security feature according to claim 1, wherein the lanthanoid M in the formula (I) or in the formula (V) is the element Tb.

4. The security feature according to claim 1, wherein, in the formula (III), R6 and R7 are the same or different and are independently an electron-donating group.

5. The security feature according to claim 1, wherein, in the case that R6, R7, R8 and/or R9 is/are independently an alkyl radical, the alkyl radical is a branched or unbranched alkyl chain having 1 to 8 carbon atoms.

6. The security feature according to claim 1, wherein, in the case that R8 and/or R9 is/are independently an aryl radical, the aryl radical is selected from the group consisting of a phenyl group and a phenyl radical having 6 to 10 carbon atoms.

7. The security feature according to claim 1, wherein, in the case that R8 and/or R9 is/are independently a benzyl radical, the benzyl radical has 7 to 10 carbon atoms.

8. The security feature according to claim 1, wherein, in the case that R8 and/or R9 is/are independently a piperidine radical, the piperidine radical is a piperidine radical substituted by alkyl substituents.

9. The security feature according to claim 1, wherein the NN ligand is a nitrogen ligand having a phenanthroline base skeleton according to the general formula (IV) where Y is NR9.

10. The security feature according to claim 9, wherein R9≠H.

11. The security feature according to claim 1, wherein R9 is an alkyl radical, tetramethylpiperidine radical or perfluorobenzyl radical.

12. The security feature according to claim 1, wherein M=Tb and, in the formula (IV), the selection is Y=NR9 and R8=H.

13. The security feature according to claim 12, wherein R9≠H.

14. The security feature according to claim 12, wherein R9 is an alkyl radical, tetramethylpiperidine radical or perfluorobenzyl radical.

15. The security feature according to claim 1, wherein the OO ligand is present either as a chelate-forming ligand or as a bridging ligand between different metal centers.

16. The security feature according to claim 1, wherein the radicals of the OO ligand are chosen such that one of the five radicals is a methoxy group and the remaining four radicals are independently selected from the group consisting of hydrogen atom, —OH, —OCH3 and halogen atom.

17. The security feature according to claim 1, wherein the radicals of the OO ligand are chosen such that the OO ligand corresponds to a 2-methoxybenzoic acid, a 3-methoxybenzoic acid or a 4-methoxybenzoic acid.

18. The security feature according to claim 1, wherein the radicals of the OO ligand are chosen such that R5 is a hydrogen atom, R1=R3=R4 and each correspond to a hydrogen atom or a fluorine atom, and R2 is a methoxy radical.

19. The security feature according to claim 1, wherein the radicals of the OO ligand are chosen such that the OO ligand corresponds to a salicylic acid derivative.

20. A process for producing the security feature according to claim 1, comprising:
   a) the providing of a solution of a metal salt comprising the lanthanoid M as cation, where M is selected from the group consisting of Eu and Tb;
   b) the providing of a solution of the deprotonated acid of the OO ligand of the formula (II)

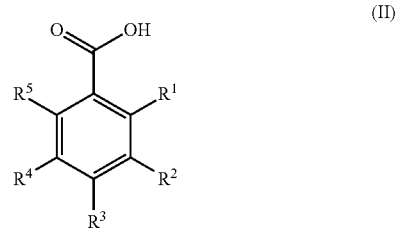

(II)

where
R1 to R5 are the same or different and are independently selected from the group consisting of hydrogen atom, OH, OCH3 and halogen atom;
   c) the providing of a solution of the NN ligand of the general formula (III) or of the general formula (IV)

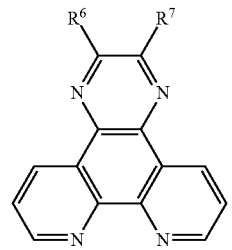

(III)

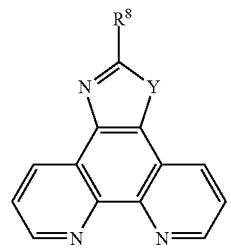

(IV)

where
Y is NR9 or Y is an oxygen atom;
R6 and R7 are the same or different and are independently selected from the group consisting of hydrogen atom and an electron-donating group;
R8 and R9 are the same or different and are independently selected from the group consisting of hydrogen atom, substituted or unsubstituted alkyl radical having 1 to 8 carbon atoms, substituted or unsubstituted aryl radical, substituted or unsubstituted piperidine radical and substituted or unsubstituted benzyl radical;
   d) the step of blending the solutions obtained in steps a), b) and c).

21. A printing ink for the printing of a document of value, wherein the printing ink comprises the security feature according to claim 1.

22. A document of value comprising the security feature according to claim 1.

23. The document of value according to claim 22, wherein the document of value is a banknote.

24. A process for producing the document of value according to claim 22, comprising:
   the providing of a substrate for the document of value;
   the printing of the substrate of the document of value with a printing ink comprising the security feature.

* * * * *